US010527735B2

(12) United States Patent
Choi et al.

(10) Patent No.: US 10,527,735 B2
(45) Date of Patent: Jan. 7, 2020

(54) APPARATUS, METHOD, USER TERMINAL APPARATUS, PROGRAM, AND COMPUTER READABLE RECORDING MEDIUM FOR MEASURING POSITION OF MOVING OBJECT

(71) Applicant: THINKWARE CORPORATION, Seongnam-si, Gyeonggi-do (KR)

(72) Inventors: Hye Sun Choi, Seongnam-si (KR); Ki Wook Lee, Seongnam-si (KR); Hye Kyung Byun, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 307 days.

(21) Appl. No.: 15/459,744

(22) Filed: Mar. 15, 2017

(65) Prior Publication Data

US 2017/0269232 A1 Sep. 21, 2017

(30) Foreign Application Priority Data

Mar. 15, 2016 (KR) .................. 10-2016-0031141

(51) Int. Cl.
*G01S 19/48* (2010.01)
(52) U.S. Cl.
CPC .................... *G01S 19/48* (2013.01)
(58) Field of Classification Search
CPC .......... G01S 19/48; G01S 19/41; G01S 19/07; G01S 19/44; G01S 5/0027
USPC .................................................... 342/357.31
See application file for complete search history.

(56) References Cited

U.S. PATENT DOCUMENTS

| | | | | |
|---|---|---|---|---|
| 6,556,832 B1 * | 4/2003 | Soliman | ................ | H04W 16/18 342/357.31 |
| 9,134,426 B1 * | 9/2015 | Siris | ....................... | G01S 19/07 |
| 2009/0243929 A1 * | 10/2009 | Sengupta | .............. | G01S 19/252 342/357.31 |
| 2010/0176992 A1 * | 7/2010 | T'siobbel | ................ | G01S 19/22 342/357.25 |
| 2013/0127663 A1 * | 5/2013 | Kim | ....................... | G01S 19/23 342/357.62 |
| 2015/0070211 A1 * | 3/2015 | Cheng | .................... | G01S 19/27 342/357.51 |
| 2016/0146616 A1 * | 5/2016 | Ren | ....................... | G01C 21/30 701/409 |
| 2016/0150192 A1 * | 5/2016 | Cheatham, III | ......... | G06K 9/00 348/143 |

* cited by examiner

*Primary Examiner* — Harry K Liu
(74) *Attorney, Agent, or Firm* — Novick, Kim & Lee, PLLC; Sang Ho Lee

(57) ABSTRACT

Disclosed herein is a method for measuring a position. The method for measuring a position includes: determining a GPS satellite visible area and a GPS satellite invisible area depending on whether or not an area is an area in which a predetermined number or more of GPS satellites are observable; measuring a position of a moving object on the basis of a first position measuring scheme using GPS satellites in the case in which the moving object enters the GPS satellite visible area; and measuring the position of the moving object on the basis of at least one of the first position measuring scheme and a second position measuring scheme other than the first position measuring scheme in the case in which the moving object enters the GPS satellite invisible area.

17 Claims, 9 Drawing Sheets

APPARATUS, METHOD, USER TERMINAL APPARATUS, PROGRAM, AND COMPUTER READABLE RECORDING MEDIUM FOR MEASURING POSITION OF MOVING OBJECT

CROSS-REFERENCE TO RELATED APPLICATION

This application claims the priority and benefit of Korean Patent Application No. 10-2016-0031141 filed on Mar. 15, 2016, with the Korean Intellectual Property Office, the disclosure of which is incorporated herein by reference.

BACKGROUND OF THE INVENTION

1. Field of the Invention

The present invention relates to an apparatus, a method, a user terminal apparatus, a program, and a computer readable recording medium for measuring a position of a moving object, and more particularly, to an apparatus, a method, a user terminal apparatus, a program, and a computer readable recording medium for measuring a position of a moving object using a global positioning system (GPS) satellite signal.

2. Description of the Related Art

As a conventional method for measuring a position of a moving object, there are a global positioning system (GPS) scheme for measuring a position of a moving object using a GPS, a triangulation scheme for measuring a position of a moving object using propagation characteristics of radio frequency signals, a cell identification (ID) scheme for tracking a position of a moving object on the basis of a position of a base station, and the like. Among them, the GPS scheme has been known as technology capable of very precisely tracking the position of the moving object at a low cost.

As GPS satellites for measuring the position in this GPS scheme, twenty four GPS satellites orbiting the earth at an altitude of about 20,000 km are used. The GPS satellites use electric waves in a band of 1.5 GHz, a control center called a control station is present on the ground and serves to collect and synchronize information transmitted from the GPS satellites, and users receive signals transmitted from a plurality of GPS satellites through GPS receives to calculate their positions and retain accuracy of positions within several meters in open areas.

Here, as a scheme for measuring the position in the GPS scheme, a triangulation scheme is used as a scheme for measuring the position in the GPS scheme. In this case, at least three satellites are required in order to perform triangulation, and an observation satellite for correcting a time error is required, such that a total of four GPS satellites are required.

In more detail, in the measurement of the position in the GPS scheme, since positions of each of the three satellites are already recognized, distances between the satellites and a GPS receiver are measured to measure the position. Here, a time spent in transferring electric waves may be recognized from a difference from a time in which the electric waves are transmitted from the satellites and a time in which the GPS receiver having a built-in clock receives the electric waves, and the distance from the satellites to the GPS receiver may be calculated by multiplying the time spent in transferring the electric waves by a light velocity.

However, according to the conventional GPS scheme described above, in the case in which reception of the GPS is interrupted due to the surrounding high buildings in a downtown concentrated high rise building area, an internal road of an apartment, or the like, it is impossible to measure the position.

In addition, according to the conventional GPS scheme, even though satellite signals required for measuring the position are received, accuracy of the position is decreased due to an error in the measured position caused by signal noise. Particularly, since the conventional GPS receiver corrects and calculates an average error by calculating all of the received signals, in the case of an invisible area in which the probability that a signal having a large error will be received is high, accuracy of the position is decreased.

In addition, according to the conventional GPS scheme, since a complicated calculation process is included, a high performance arithmetic unit is required in the GPS receiver, and large power is consumed for calculation.

SUMMARY OF THE INVENTION

An object of the present invention is to provide an apparatus, a method, a user terminal apparatus, a program, and a computer readable recording medium for measuring a position of a moving object by predicting a global positioning system (GPS) satellite visible area and a GPS satellite invisible area and measuring the position of the moving object using a position measuring scheme appropriate for the corresponding area when the moving object enters the corresponding area.

According to an exemplary embodiment of the present invention, a method for measuring a position may include: determining a GPS satellite visible area and a GPS satellite invisible area depending on whether or not an area is an area in which a predetermined number or more of GPS satellites are observable; measuring a position of a moving object on the basis of a first position measuring scheme using GPS satellites in the case in which the moving object enters the GPS satellite visible area; and measuring the position of the moving object on the basis of at least one of the first position measuring scheme and a second position measuring scheme other than the first position measuring scheme in the case in which the moving object enters the GPS satellite invisible area.

In the determining, the GPS satellite visible area and the GPS satellite invisible area may be determined using real world height information and orbit information of the GPS satellites.

The orbit information of the GPS satellites may be Ephemeris information included in GPS signals.

The determining may include: determining heights of objects and a bare earth positioned in the real world using the real world height information; and determining a GPS satellite observable angle on the basis of a position of the moving object that is to travel in a corresponding area and the determined heights.

The determining may further include defining a GPS satellite observable area on the basis of the determined GPS satellite observable angle.

The GPS satellite observable area may have a shape in which it has a predetermined angle determined on the basis of the determined GPS satellite observable angle as a center angle and has a bottom surface toward the sky in which the GPS satellites are positioned.

The determining may further include: determining the number of GPS satellites positioned in the GPS satellite observable area using the orbit information of the GPS satellites; determining that a corresponding area is the GPS satellite visible area in the case in which the number of GPS satellites positioned in the GPS satellite observable area is four or more; and determining that a corresponding area is the GPS satellite invisible area in the case in which the number of GPS satellites positioned in the GPS satellite observable area is less than four.

In the measuring of the position, the position of the moving object may be measured in a state in which orbit information of a GPS satellite that is not observable in a corresponding area is excluded when the orbit information of the GPS satellite that is not observable is received.

The second position measuring scheme may include at least one of a position measuring scheme using speed information and steering information of the moving object, a position measuring scheme using wireless fidelity (Wi-Fi), and a position measuring scheme using comparison between an image photographed in real time and pre-stored real world modeling data.

According to another exemplary embodiment of the present invention, an apparatus for measuring a position may include: a determining unit determining a GPS satellite visible area and a GPS satellite invisible area depending on whether or not an area is an area in which a predetermined number or more of GPS satellites are observable; and a position measuring unit measuring a position of a moving object on the basis of a first position measuring scheme using GPS satellites in the case in which the moving object enters the GPS satellite visible area and measuring the position of the moving object on the basis of at least one of the first position measuring scheme and a second position measuring scheme other than the first position measuring scheme in the case in which the moving object enters the GPS satellite invisible area.

The determining unit may determine the GPS satellite visible area and the GPS satellite invisible area using real world height information and orbit information of the GPS satellites.

The orbit information of the GPS satellites may be Ephemeris information included in GPS signals.

The determining unit may include: a height determining unit determining heights of objects and a bare earth positioned in the real world using the real world height information; and an angle determining unit determining a GPS satellite observable angle on the basis of a position of the moving object that is to travel in a corresponding area and the determined heights.

The determining unit may further include a GPS satellite observable area defining unit defining a GPS satellite observable area on the basis of the determined GPS satellite observable angle.

The GPS satellite observable area may have a shape in which it has a predetermined angle determined on the basis of the determined GPS satellite observable angle as a center angle and has a bottom surface toward the sky in which the GPS satellites are positioned.

The determining unit may further include: a GPS satellite number determining unit determining the number of GPS satellites positioned in the GPS satellite observable area using the orbit information of the GPS satellites; a GPS satellite visible area determining unit determining that a corresponding area is the GPS satellite visible area in the case in which the number of GPS satellites positioned in the GPS satellite observable area is four or more; and a GPS satellite invisible area determining unit determining that a corresponding area is the GPS satellite invisible area in the case in which the number of GPS satellites positioned in the GPS satellite observable area is less than four.

The measuring unit may measure the position of the moving object in a state in which orbit information of a GPS satellite that is not observable in a corresponding area is excluded when the orbit information of the GPS satellite that is not observable is received.

The second position measuring scheme may include at least one of a position measuring scheme using speed information and steering information of the moving object, a position measuring scheme using wireless fidelity (Wi-Fi), and a position measuring scheme using comparison between an image photographed in real time and pre-stored real world modeling data.

According to still another exemplary embodiment of the present invention, a user terminal apparatus may include: a position measurement unit measuring a position of the user terminal apparatus; and a display unit displaying the measured position, wherein the position measurement unit includes: a determining unit determining a GPS satellite visible area and a GPS satellite invisible area depending on whether or not an area is an area in which a predetermined number or more of GPS satellites are observable; and a position measuring unit measuring a position of a moving object on the basis of a first position measuring scheme using GPS satellites in the case in which the moving object enters the GPS satellite visible area and measuring the position of the moving object on the basis of at least one of the first position measuring scheme and a second position measuring scheme other than the first position measuring scheme in the case in which the moving object enters the GPS satellite invisible area.

According to yet still another exemplary embodiment of the present invention, a program may be stored in a computer readable recording medium and execute the method for measuring a position described above.

According to yet still another exemplary embodiment of the present invention, a computer readable recording medium may record a program for executing the method for measuring a position described above therein.

DETAILED DESCRIPTION

The following description illustrates only a principle of the present invention. Therefore, those skilled in the art may implement the principle of the present invention and invent various apparatuses included in the spirit and scope of the present invention although not clearly described or illustrated in the present specification. In addition, it is to be understood that all conditional terms and exemplary embodiments mentioned in the present specification are obviously intended only to allow those skilled in the art to understand a concept of the present invention in principle, and the present invention is not limited to exemplary embodiments and states particularly mentioned as such.

Further, it is to be understood that all detailed descriptions mentioning specific exemplary embodiments of the present invention as well as principles, aspects, and exemplary embodiments of the present invention are intended to include structural and functional equivalences thereof. Further, it is to be understood that these equivalences include an equivalence that will be developed in the future as well as an equivalence that is currently well-known, that is, all devices invented so as to perform the same function regardless of a structure.

Therefore, it is to be understood that all flow charts, state transition diagrams, pseudo-codes, and the like, illustrate various processes that may be tangibly embodied in a computer readable medium and that are executed by computers or processors regardless of whether or not the computers or the processors are clearly illustrated.

Functions of various devices including processors or functional blocks represented as concepts similar to the processors and illustrated in the accompanying drawings may be provided using hardware having capability to execute appropriate software as well as dedicated hardware. When the functions are provided by the processors, they may be provided by a single dedicated processor, a single shared processor, or a plurality of individual processors, and some of them may be shared with each other.

The above-mentioned objects, features, and advantages will become more obvious from the following detailed description associated with the accompanying drawings. Therefore, those skilled in the art to which the present invention pertains may easily practice a technical idea of the present invention. Further, in describing the present invention, in the case in which it is decided that a detailed description of a well-known technology associated with the present invention may unnecessarily make the gist of the present invention unclear, it will be omitted.

Hereinafter, various exemplary embodiments of the present invention will be described in detail with reference to the accompanying drawings.

Figure 1:
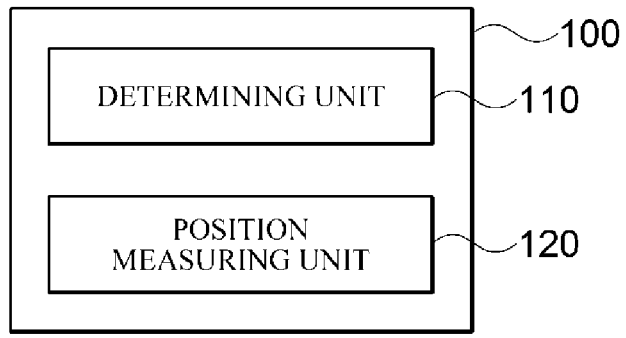
FIG. 1 is a block diagram illustrating an apparatus for measuring a position according to an exemplary embodiment of the present invention.
Figure 2:
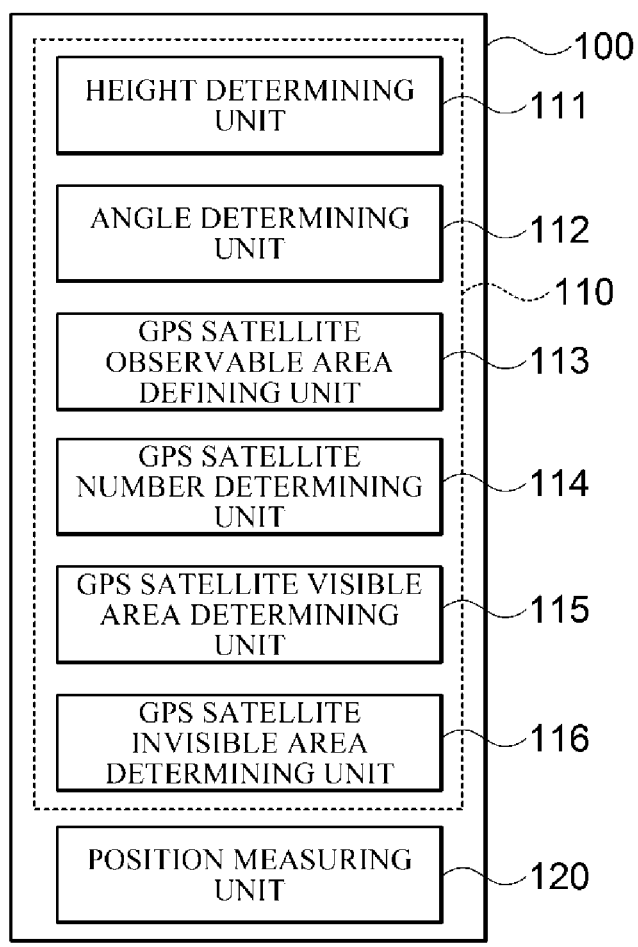
FIG. 2 is a block diagram illustrating the apparatus for measuring a position according to an exemplary embodiment of the present invention in more detail.

FIG. 1 is a block diagram illustrating an apparatus for measuring a position according to an exemplary embodiment of the present invention. FIG. 2 is a block diagram illustrating the apparatus for measuring a position according to an exemplary embodiment of the present invention in more detail. Referring to FIGS. 1 and 2, the apparatus 100 for measuring a position includes a determining unit 110 and a position measuring unit 120. In addition, the determining unit 110 includes all or some of a height determining unit 111, an angle determining unit 112, a GPS satellite observable area defining unit 113, a GPS satellite number determining unit 114, a GPS satellite visible area determining unit 115, and a GPS satellite invisible area determining unit 116.

The apparatus 100 for measuring a position may predict a GPS satellite visible area and a GPS satellite invisible area, and measure a position of a moving object using a position measuring scheme appropriate for the corresponding area when the moving object enters the corresponding area. The moving object, which is a movable object of which a position needs to be measured, may be, for example, a person, a dog, a vehicle, a ship, or the like.

As an example, the determining unit 110 may analyze data indicating all areas constituting the real world, for example, data indicating a bare earth height, a building height, and the like, in advance to determine the GPS satellite visible area and the GPS satellite invisible area, and allocate and store result values depending on the determination to each area.

As another example, the determining unit 110 may analyze data indicating an area in a predetermined distance range on the basis of a current position of the moving object, for example, data indicating a bare earth height, a building height, and the like, in advance to determine the GPS satellite visible area and the GPS satellite invisible area, and allocate and store result values depending on the determination to each area.

That is, a determining process of the determining unit 110 may be performed before the moving object enters the corresponding area. In detail, the determining unit 110 may predict and determine the GPS satellite visible area and the GPS satellite invisible area using real world height information and orbit information of GPS satellites, and allocate and store result values depending on the determination to each area.

To this end, the determining unit 110 may determine the GPS satellite visible area and the GPS satellite invisible area depending on whether or not an area is an area in which a predetermined number or more of GPS satellites are observable. In this case, the determining unit 110 may determine the GPS satellite visible area and the GPS satellite invisible area using the real world height information and the orbit information of the GPS satellites.

Here, the real world height information may include digital elevation model (DEM) data, which are a digital model representing a bare earth portion except for objects such as buildings, trees, artificial structures, and the like, in real world bare earth information.

In addition, the real world height information may include a digital surface model (DSM) data, which are a model representing all kinds of real world information, that is, a bare earth and objects such as trees, buildings, artificial structures, and the like.

Further, the real world height information may include data indicating digitized heights of only objects such as buildings, trees, artificial structures, and the like, positioned in the real world.

The determining unit 110 may determine a height of a bare earth, and heights of the objects such as the buildings, the trees, and the artificial structures, and the like, on the basis of the real world height information.

The real world height information may be stored in a server apparatus, and may be transmitted to the apparatus 100 for measuring a position through real time communication and be used in the apparatus 100 for measuring a position. Alternatively, the real world height information may be pre-stored and used in a storage medium of the apparatus 100 for measuring a position.

Meanwhile, the orbit information of GPS satellites may be included in signals transmitted from the GPS satellites, and may include Almanac information and Ephemeris information. Preferably, the orbit information of GPS satellites may be the Ephemeris information.

The Almanac information is schematic orbit parameter information for a layout of the GPS satellites. The apparatus 100 for measuring a position may schematically figure out from which satellites it may receive signals at a specific point in a specific time using the Almanac information.

The Ephemeris information is elaborate orbit and time correction information of each of the GPS satellites, and a control station positioned on the ground updates the Ephemeris information per five hours and provide the updated Ephemeris information to the GPS satellites. In addition, each GPS satellite receiving the Ephemeris information periodically retransmits the Ephemeris information of the corresponding satellite. In this case, the apparatus 100 for measuring a position may recognize an accurate position of a specific satellite using recent Ephemeris information of the corresponding satellite. However, in the case in which the apparatus 100 for measuring a position does not have the recent Ephemeris information, the apparatus 100 for measuring a position should newly receive the Ephemeris information, and should newly receive entire information from beginning to end of the next transmission period when it starts to receive data from the middle of the data.

Meanwhile, the determining unit 110 may determine the GPS satellite visible area and the GPS satellite invisible area using the real world height information described above and the orbit information of the GPS satellites described above.

In detail, the height determining unit 111 may determine the heights of the objects positioned in the real world and the height of the bare earth positioned in the real world using the real world height information. In addition, the angle determining unit 112 may determine a GPS satellite observable angle on the basis of a position of the moving object that is to travel in a corresponding area and the calculated heights of the objects. This will be described in more detail with reference to FIGS. 3A and 3B.

Figure 3A:
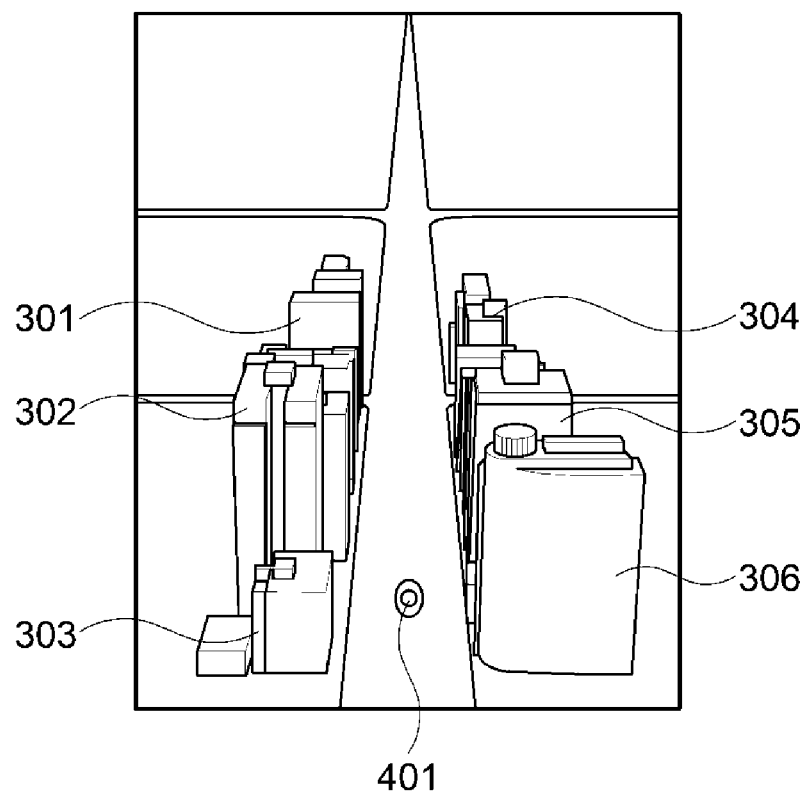
FIGS. 3A and 3B are conceptual diagrams illustrating an example of calculating a global positioning system (GPS) satellite observable angle according to an exemplary embodiment of the present invention.
Figure 3B:
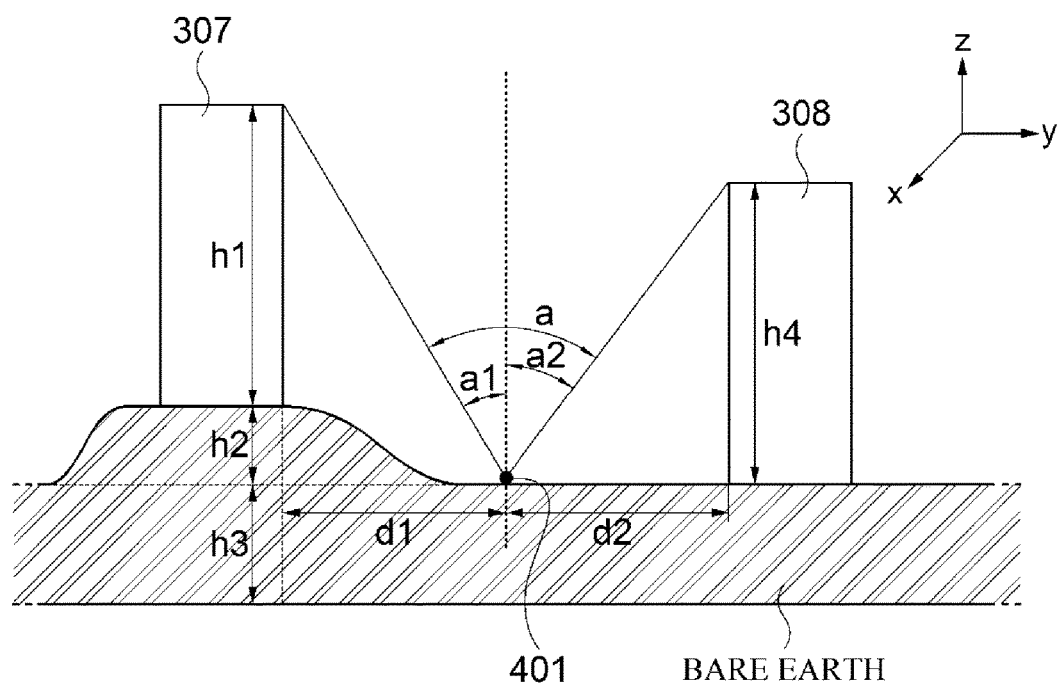

FIGS. 3A and 3B are conceptual diagrams illustrating an example of calculating a global positioning system (GPS) satellite observable angle according to an exemplary embodiment of the present invention. Various objects may be present in a real world environment in which a moving object moves. As an example, in the case in which the real world in which a moving object 401 moves is a downtown, various objects 301, 302, 303, 304, 305, and 306 such as high rise buildings, buildings, and the like, as illustrated in FIG. 3A may be present. In addition, the moving object 401 may travel along a road present in the downtown.

In the real world environment, the height determining unit 111 may determine heights of the various objects 301, 302, 303, 304, 305, and 306 positioned in the real world and a height of a bare earth positioned in the real world using the real world height information.

As an example, FIG. 3B is a view illustrating a real world environment represented on a Y-Z plane. In the case in which an object 307 positioned in a predetermined area is positioned at a height higher than that of a point at which a moving object 401 moves and an object 308 is positioned on the same height as that of the point at which the moving object 401 moves, the real world environment may be represented on the Y-Z plane as illustrated in FIG. 3B.

Referring to FIG. 3B, the height determining unit 111 may determine a bare earth height h3 of the point at which the moving object 401 moves in a specific area, determine a bare earth height h2+h3 of the object 307 in the specific area, and determine a height h1 of the object 307.

In addition, the height determining unit 111 may determine a bare earth height h3 of the object 308 in the specific area, and determine a height h4 of the object 308.

In this case, the angle determining unit 112 may determine the GPS satellite observable angle on the basis of the position of the moving object that is to move in the corresponding area and the determined heights. As an example, referring to FIG. 3B, the angle determining unit 112 may calculate a distance d1 between the moving object 401 and the object 307 on the basis of the position of the moving object 401 that is to travel in the corresponding area, and calculate an angle a1 on the basis of the calculated distance d1 and the determined height h1+h2. In addition, the angle determining unit 112 may calculate a distance d2 between the moving object 401 and the object 308 on the basis of the position of the moving object 401 that is to travel in the corresponding area, and calculate an angle a2 on the basis of the calculated distance d and the determined height h4. In addition, the angle determining unit 112 may add up the calculated angles a1 and a2 to determine the GPS satellite observable angle a.

In addition, the angle determining unit 112 may perform the above-mentioned angle determining process on a Y-Z plane having an X coordinate value that is the same as an X coordinate value of the moving object 401 and a Y-Z plane having an X coordinate value that is different from the X coordinate value of the moving object 401 to calculate a plurality of angle values.

Meanwhile, the GPS satellite observable area defining unit 113 may define a GPS satellite observable area in which the GPS satellites may be observed on the basis of the calculated angles.

Figure 4:
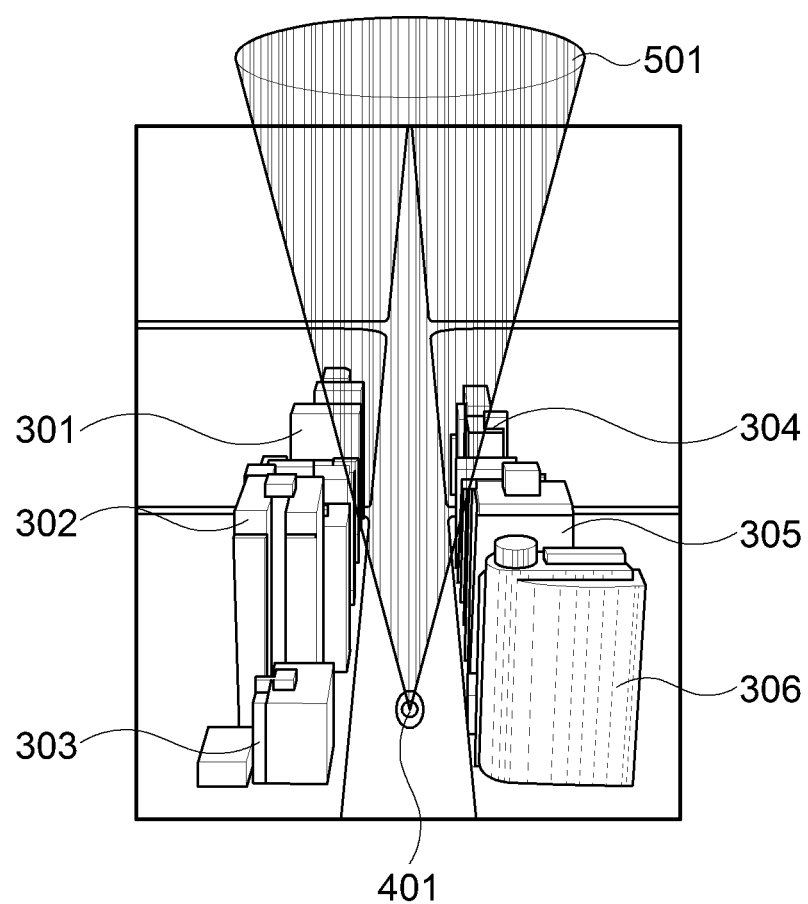
FIG. 4 is a conceptual diagram illustrating a GPS satellite observable area according to an exemplary embodiment of the present invention.

FIG. 4 is a conceptual diagram illustrating a GPS satellite observable area according to an exemplary embodiment of the present invention. Referring to FIG. 4, the GPS satellite observable area defining unit 113 may define a GPS satellite observable area 501 on the basis of the calculated GPS satellite observable angle.

Here, the GPS satellite observable area 501 may have a predetermined angle determined on the basis of the determined GPS satellite observable angle as a center angle. Here, the predetermined angle may be determined on the basis of the smallest angle of a plurality of observable angles calculated on the basis of a position at which the moving object 401 moves.

In addition, the GPS satellite observable area 501 may have a bottom surface toward the sky in which the GPS satellites are positioned.

As an example, as illustrated in FIG. 4, the GPS satellite observable area 501 may have an inverted cone shape.

Meanwhile, the GPS satellite number determining unit 114 may determine the number of GPS satellites positioned in the GPS satellite observable area 501 among a plurality of GPS satellites using the orbit information of the GPS satellites. In detail, the Ephemeris information of the GPS satellites is elaborate orbit and time correction information of each of the GPS satellites, and accurate positions of corresponding satellites may be recognized on the basis of the Ephemeris information. Therefore, the GPS satellite number determining unit 114 may determine the number of GPS satellites positioned in the GPS satellite observable area among the plurality of GPS satellites using the Ephemeris information of the GPS satellites.

Meanwhile, the determining unit 110 may determine that a corresponding area is the GPS satellite visible area or the GPS satellite invisible area on the basis of the number of GPS satellites in the GPS satellite observable area determined in the GPS satellite number determining unit 114.

In more detail, as a scheme for measuring a position in a GPS scheme, a triangulation scheme is used as a scheme for measuring the position in the GPS scheme. In this case, at least three satellites are required in order to perform triangulation, and an observation satellite for correcting a time error is required, such that a total of four GPS satellites are required. Therefore, the determining unit 110 may determine that the corresponding area is the GPS satellite visible area or the GPS satellite invisible area depending on whether or not the number of GPS satellites in the GPS satellite observable area determined in the GPS satellite number determining unit 114 is four or more.

This will be described in detail with reference to FIGS. 5 and 6.

Figure 5:
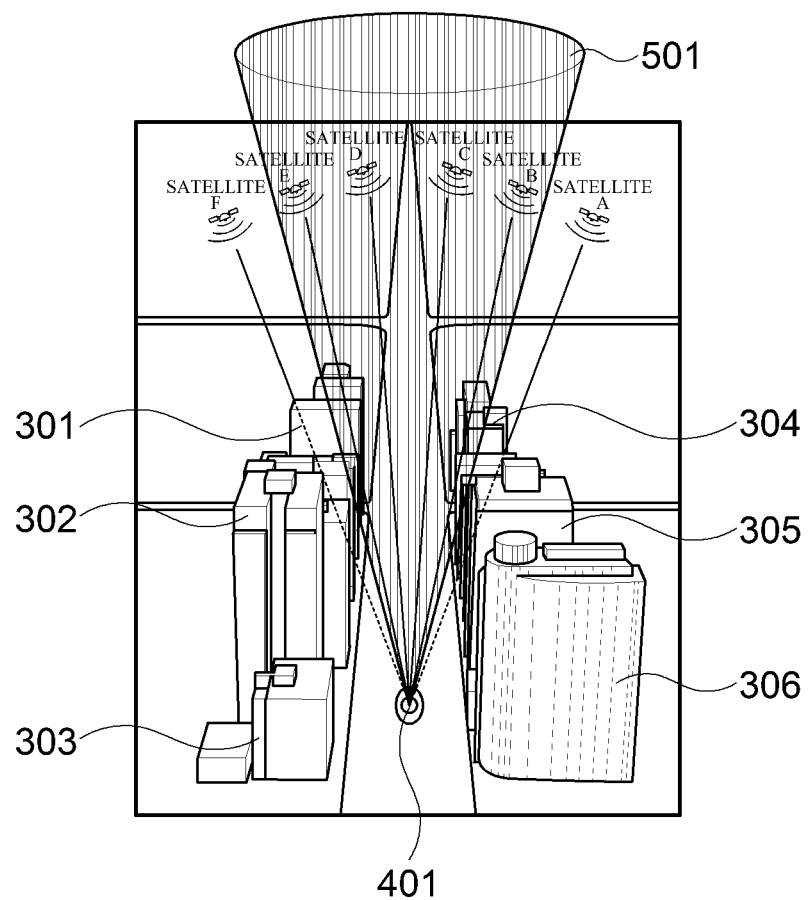
FIG. 5 is a conceptual diagram illustrating a GPS satellite visible area according to an exemplary embodiment of the present invention.

FIG. 5 is a conceptual diagram illustrating a GPS satellite visible area according to an exemplary embodiment of the present invention. FIG. 6 is a conceptual diagram illustrating a GPS satellite invisible area according to an exemplary embodiment of the present invention.

Referring to FIG. 5, a GPS satellite B, a GPS satellite C, a GPS satellite D, and a GPS satellite E of a plurality of GPS satellites may be positioned in the GPS satellite observable area 501. That is, four or more GPS satellites may be positioned in the GPS satellite observable area 501.

In this case, the GPS satellite visible area determining unit 115 may determine that a corresponding area is the GPS satellite visible area. In addition, the GPS satellite visible area determining unit 115 may allocate and store data indicating that the corresponding area is the GPS satellite visible area to the corresponding area.

Figure 6:
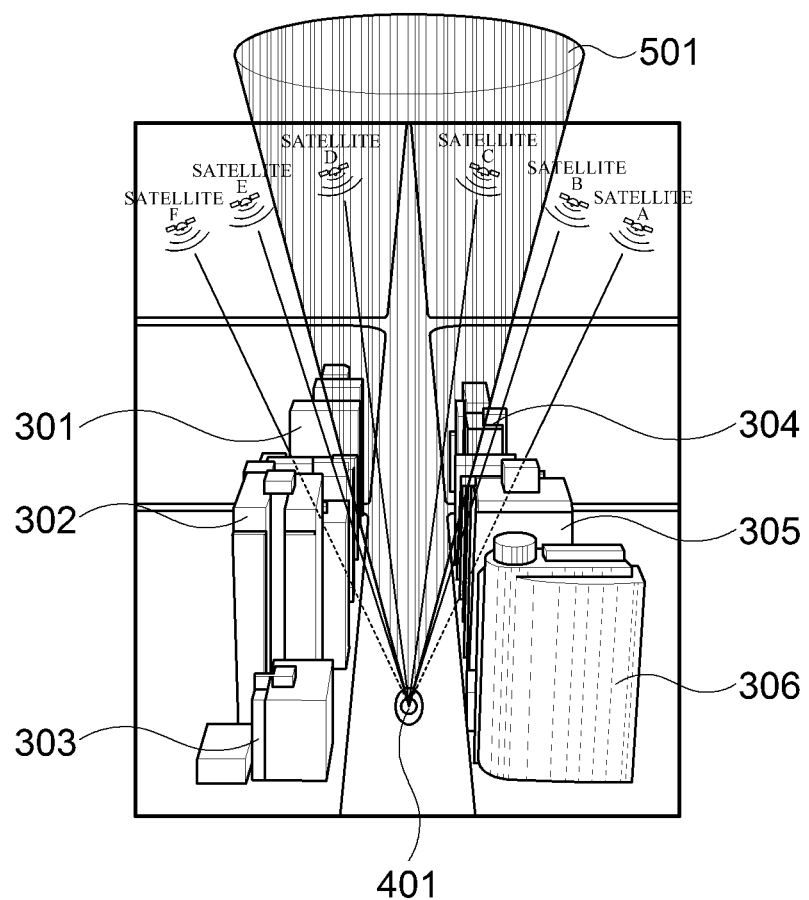
FIG. 6 is a conceptual diagram illustrating a GPS satellite invisible area according to an exemplary embodiment of the present invention.

Referring to FIG. 6, a GPS satellite C and a GPS satellite D of a plurality of GPS satellites may be positioned in the GPS satellite observable area 501. That is, GPS satellites less than four GPS satellites may be positioned in the GPS satellite observable area 501.

In this case, the GPS satellite invisible area determining unit 116 may determine that a corresponding area is the GPS satellite invisible area. In addition, the GPS satellite invisible area determining unit 116 may allocate and store data indicating that the corresponding area is the GPS satellite invisible area to the corresponding area.

The determining operations of the GPS satellite visible area determining unit 115 and the GPS satellite invisible area determining unit 116 described above may be performed before the moving object enters the corresponding areas. In addition, since orbits of the plurality of GPS satellites are changed in real time, the GPS satellite visible area determining unit 115 and the GPS satellite invisible area determining unit 116 may repeat the determining operations to continuously update data allocated to the corresponding areas and indicating that the corresponding areas are the GPS satellite visible/invisible areas.

Meanwhile, although the GPS satellite invisible area and the GPS satellite visible area are determined on the basis of whether or not four GPS satellites are observable in the example described above, this is only an exemplary embodiment of the present invention, and the number of GPS satellites is not limited thereto. According to another implementation, the reference number of GPS satellites may be three, which is a minimum number of GPS satellites for triangulation.

Meanwhile, the position measuring unit 120 may measure a position of the moving object on the basis of a first position measuring scheme using the GPS satellites in the case in which the moving object enters the GPS satellite visible area. Here, the first position measuring scheme is a position measuring scheme using the GPS satellites, and the position of the moving object may be measured through at least one of a standard GPS (SGPS) position measuring scheme, a differential GPS (DGPS) position measuring scheme of correcting an error for a position calculated by the SGPS position measuring scheme, an assisted-GPS (A-GPS) position measuring scheme, and a double differential GPS position measuring scheme.

In addition, the position measuring unit 120 may measure the position of the moving object on the basis of at least one the first position measuring scheme and a second position measuring scheme in the case in which the moving object enters the GPS satellite invisible area. As an example, the position measuring unit 120 may measure the position of the moving object by collectively considering a position calculated depending on the first position measuring scheme and a position calculated depending on the second position measuring scheme. Alternatively, the position measuring unit 120 may measure the position of the moving object using only the second position measuring scheme in the case in which it is impossible to measure the position depending on the first position measuring scheme due to interruption of signals, or the like.

Here, the second position measuring scheme may include at least one of a position measuring scheme using speed information and steering information of the moving object, a position measuring scheme using wireless fidelity (Wi-Fi), and a position measuring scheme using comparison between and analysis of an image photographed in real time and pre-stored real world modeling data.

For example, the position measuring unit 120 may obtain at least one of speed sensing information and steering sensing information from a converter (for example, an audio video navigation (AVN) device, an audio device, or an electronic control unit (ECU)) of the vehicle connected to at least one of a speed sensor and a steering sensor of the vehicle. Here, information may be transmitted between the speed sensor and the steering sensor of the vehicle and the converter through controller area network (CAN) communication or local interconnect network (LIN) communication. In this case, the position measuring unit 120 may calculate a moving distance and a rotation angle of the vehicle using the speed sensing information and the steering sensing information received in a predetermined time (for example, 1 second) unit, and measure the position of the moving object on the basis of the calculated moving distance and rotation angle.

As another example, the position measuring unit 120 may convert strength of a plurality of Wi-Fi signals into a distance to obtain a contact point or a central point, and measure the position of the moving object on the basis of the contact point or the central point.

As still another example, the position measuring unit 120 may compare and analyze an image photographed in real time during the travel of the moving object and pre-stored real world modeling data with each other, and measure the position of the moving object on the basis of a comparison and analysis result.

In more detail, the position measuring unit 120 may receive the image photographed in real time during the travel of the moving object. In addition, the position measuring unit 120 may compare the real world modeling data indicating feature points, vertex coordinate values, and the like, of objects, bare earths positioned in the real world and the received photographed image with each other to detect the real world modeling data matched to the photographed image. In addition, the position measuring unit 120 may measure the position of the moving object on the basis of position information corresponding to the detected real world modeling data.

According to the present invention, the GPS satellite invisible area in which reception of the GPS is interrupted or is not smooth due to the surrounding high buildings in a downtown concentrated high rise building area, an internal road of an apartment, or the like, is predicted, and in the case in which the moving object enters the GPS satellite invisible area, the position of the moving object is measured on the basis of at least one of the first position measuring scheme and the second position measuring scheme to minimize a position measuring error in the GPS satellite invisible area, thereby making it possible to improve accuracy of the position.

Meanwhile, according to an exemplary embodiment of the present invention, in the case in which the number of GPS satellites that are observable in the GPS satellite visible area exceeds four, the position measuring unit 120 may select a minimum number of GPS satellites required for measuring the position among the plurality of GPS satellites, and measure the position of the moving object using orbit information of each of the selected GPS satellites. Here, the minimum number may be four, but is not limited thereto. That is, the minimum number may be less than four or more than four, depending on an implementation.

According to the present invention, the position of the moving object is measured using only the orbit information of the minimum number of GPS satellites required for measuring the position, thereby making it possible to minimize consumption of a current, a time, a memory, and the like, due to the use of information unnecessary for measuring the position.

Meanwhile, the position measuring unit 120 may measure the position of the moving object in a state in which orbit information of a GPS satellite that is not observable in the corresponding area is excluded when the orbit information of the GPS satellite that is not observable is received.

As an example, when a signal of a GPS satellite is reflected on an object of the real world such as a building, a tree, or the like, the signal of the GPS satellite may be a signal of a GPS satellite that is not observable at a current position of the moving object. For example, a GPS satellite B, a GPS satellite C, a GPS satellite D, and a GPS satellite E are observable at the current position of the moving object, and a case in which a signal is received from a GPS satellite F may occur. In this case, the position measuring unit 120 may exclude orbit information of the GPS satellite F at the time of measuring the position, and may measure the position of the moving object using orbit information of each of the GPS satellite B, the GPS satellite C, the GPS satellite D, and the GPS satellite E.

According to the present invention, the orbit information of the GPS satellite that is not observable at the current position of the moving object is excluded at the time of measuring the position of the moving object, thereby making it possible to minimize the consumption of the current, the time, the memory, and the like, due to the use of unnecessary information and improve the accuracy of the position.

Figure 7:
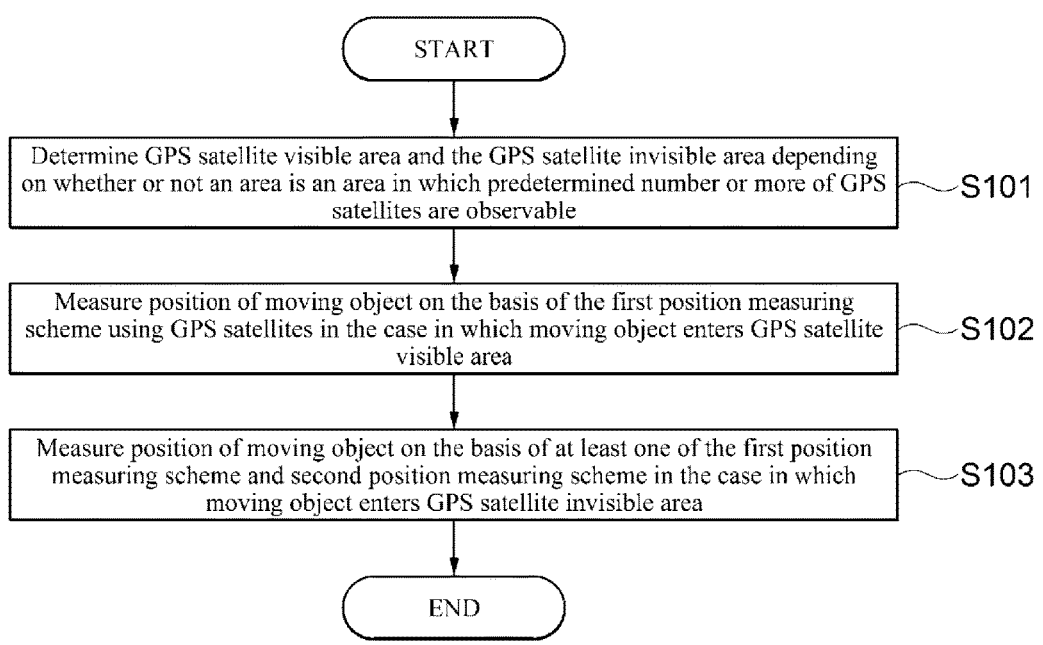
FIG. 7 is a flow chart illustrating a method for measuring a position according to an exemplary embodiment of the present invention.

FIG. 7 is a flow chart illustrating a method for measuring a position according to an exemplary embodiment of the present invention. Referring to FIG. 7, the apparatus 100 for measuring a position may determine the GPS satellite visible area and the GPS satellite invisible area depending on whether or not an area is an area in which a predetermined number or more of GPS satellites are observable (S101). In this case, the apparatus 100 for measuring a position may determine the GPS satellite visible area and the GPS satellite invisible area using the bare earth height information and the orbit information of the GPS satellites. Here, the orbit information of GPS satellites may be the Ephemeris information included in the GPS signal.

The determining process (S101) may be performed before the moving object enters the corresponding area. In addition, since orbits of the plurality of GPS satellites are change in real time, the GPS satellite visible area and the GPS satellite invisible area determined depending on the determining process (S101) may be continuously updated.

Meanwhile, the apparatus 100 for measuring a position may measure the position of the moving object on the basis of the first position measuring scheme using the GPS satellites (S102) in the case in which the moving object enters the GPS satellite visible area.

In addition, the apparatus 100 for measuring a position may measure the position of the moving object on the basis of at least one of the first position measuring scheme and the second position measuring scheme other than the first position measuring scheme (S103) in the case in which the moving object enters the GPS satellite invisible area.

Figure 8:
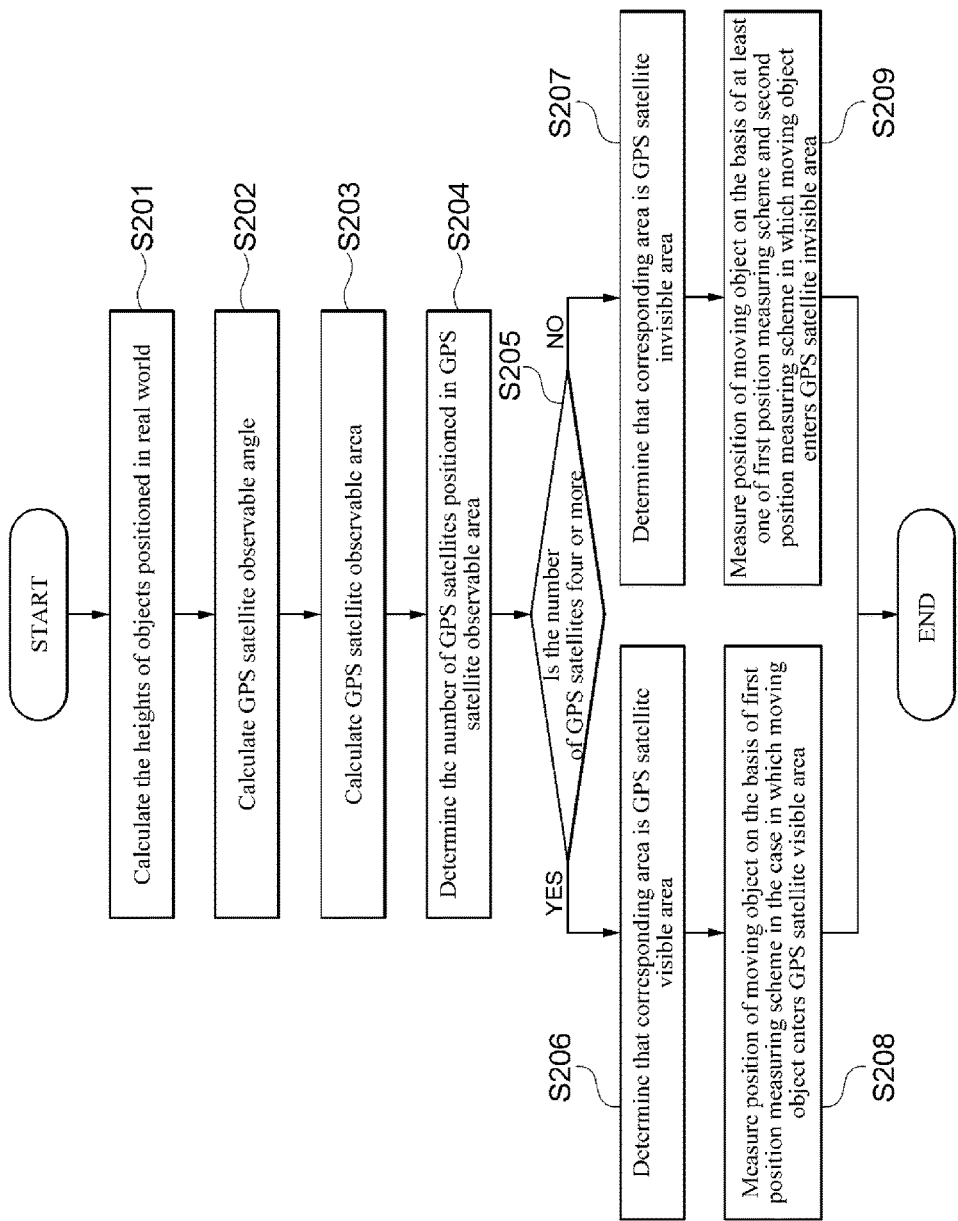
FIG. 8 is a flow chart illustrating the method for measuring a position according to an exemplary embodiment of the present invention in detail.

FIG. 8 is a flow chart illustrating the method for measuring a position according to an exemplary embodiment of the present invention in detail. Referring to FIG. 8, the apparatus 100 for measuring a position may calculate the heights of the objects positioned in the real world using the bare earth height information (S201).

In addition, the apparatus 100 for measuring a position may calculate the GPS satellite observable angle on the basis of the position of the moving object that is to travel in the corresponding area and the calculated heights of the objects (S202).

In addition, the apparatus 100 for measuring a position may define the GPS satellite observable area on the basis of the calculated GPS satellite observable angle (S203). Here, the GPS satellite observable area may have a shape in which it has a predetermined angle determined on the basis of the determined GPS satellite observable angle as a center angle and has a bottom surface toward the sky in which the GPS satellites are positioned. As an example, the GPS satellite observable area may an inverted cone shape.

In addition, the apparatus 100 for measuring a position may determine the number of GPS satellites positioned in the GPS satellite observable area using the orbit information of the GPS satellites (S204).

In the case in which the number of GPS satellites positioned in the GPS satellite observable area is four or more (S205:Y), the apparatus 100 for measuring a position may determine that the corresponding area is the GPS satellite visible area (S206).

However, in the case in which the number of GPS satellites positioned in the GPS satellite observable area is less than four (S205:N), the apparatus 100 for measuring a position may determine that the corresponding area is the GPS satellite invisible area (S207).

Meanwhile, in the case in which the moving object enters the GPS satellite visible area, the apparatus 100 for measuring a position may measure the position of the moving object on the basis of the first position measuring scheme using the GPS satellites (S208).

In addition, in the case in which the moving object enters the GPS satellite invisible area, the apparatus 100 for measuring a position may measure the position of the moving object on the basis of at least one of the first position measuring scheme and the second position measuring scheme other than the first position measuring scheme (S209).

Meanwhile, the method for measuring a position according to an exemplary embodiment of the present invention may further include measuring the position of the moving object in a state in which the orbit information of the GPS satellite that is not observable in the corresponding area is excluded when the orbit information of the GPS satellite that is not observable is received.

Meanwhile, the apparatus 100 for measuring a position may be implemented using software, hardware, or a combination thereof. As an example, according to a hardware implementation, the apparatus 100 for measuring a position may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions.

In addition, the apparatus 100 for measuring a position may be installed as one module in a user terminal apparatus 200 to be described below. In this case, the apparatus 100 for measuring a position may measure a position of the user terminal apparatus 200 by performing the position measuring function described above. This will be described in detail with reference to FIG. 9.

Figure 9:
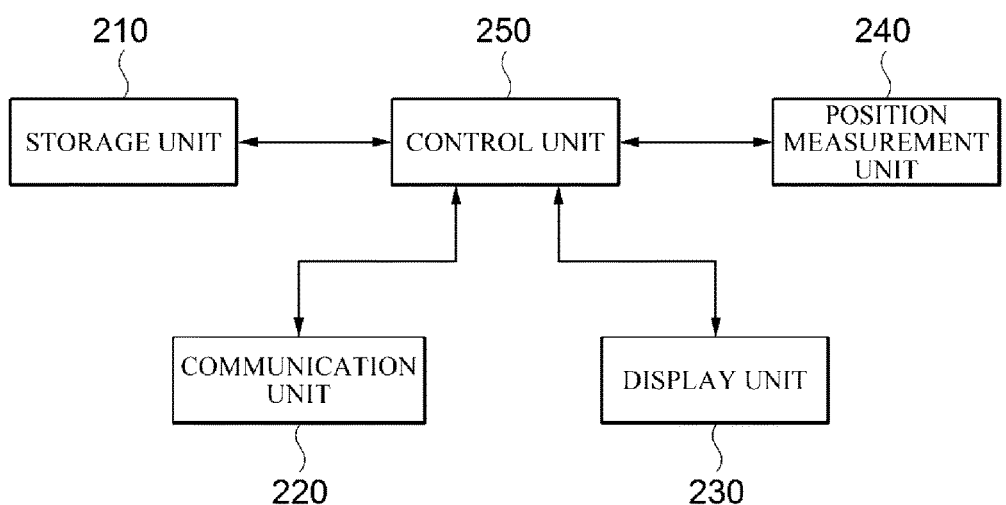
FIG. 9 is a block diagram illustrating a user terminal apparatus according to an exemplary embodiment of the present invention.

FIG. 9 is a block diagram illustrating a user terminal apparatus according to an exemplary embodiment of the present invention in detail. Referring to FIG. 9, the user terminal apparatus 200 includes all or some of a storage unit 210, a communication unit 220, a display unit 230, a position measurement unit 240, and a control unit 250.

Here, the user terminal apparatus 200 may be implemented by a smart phone, a tablet computer, a laptop computer, a personal digital assistant (PDA), a portable multimedia player (PMP), a navigation device, a wearable device, or the like, and the wearable device may be implemented by a smart glass or a smart watch that is wearable on a body of a user.

The storage unit 210 serves to store various data and applications required for an operation of the user terminal apparatus 200 therein. As an example, the storage unit 210 may store the real world height information and the orbit information of the GPS satellites therein. In addition, when the GPS satellite visible area and the GPS satellite invisible area are determined, the storage unit 210 may allocate and store data indicating the GPS satellite visible area and data indicating the GPS satellite invisible area to each of a plurality of areas constituting the real worlds.

Here, the storage unit 210 may be implemented by a detachable type of storing device such as a universal serial bus (USB) memory, or the like, as well as an embedded type of storing device such as a random access memory (RAM), a flash memory, a read only memory (ROM), an erasable programmable ROM (EPROM), an electronically erasable and programmable ROM (EEPROM), a register, a hard disk, a removable disk, a memory card, or the like.

The communication unit 220 may provide a communication function to the user terminal apparatus 200. As an example, the real world height information and/or the orbit information of the GPS satellites may be stored in a server apparatus. In this case, the communication unit 220 of the user terminal apparatus 200 may receive the real world height information and/or the orbit information of the GPS satellites from the server apparatus.

Here, the communication unit 220 may be implemented using various communication schemes such as a connection form in a wireless or wired scheme through a local area network (LAN) and the Internet network, a connection form through a USB port, a connection form through a mobile communication network such as the 3G and 4G mobile communication networks, and a connection form through a short range wireless communication scheme such as near field communication (NFC), radio frequency identification (RFID), Wi-Fi, or the like.

The display unit 230 serves to display a screen. Particularly, when the position of the user terminal apparatus 200 is measured in the position measurement unit 240, the display unit 230 may display the measured position.

Here, the display unit 230 may be implemented by at least one of a liquid crystal display, a thin film transistor-liquid crystal display, an organic light-emitting diode, a flexible display, a 3D display, a transparent display, a head up display (HUD), a head mounted display (HMD), and a prism project display.

The position measurement unit 240 may perform a function of the apparatus 100 for measuring a position illustrated in FIGS. 1 to 8. In detail, the position measurement unit 240 may determine the GPS satellite visible area and the GPS satellite invisible area depending on whether or not an area is an area in which a predetermined number or more of GPS satellites are observable. In addition, in the case in which the moving object enters the GPS satellite visible area, the position measurement unit 240 may measure the position of the moving object on the basis of the first position measuring scheme using the GPS satellites. In addition, in the case in which the moving object enters the GPS satellite invisible area, the position measurement unit 240 may measure the position of the moving object on the basis of at least one of the first position measuring scheme and the second position measuring scheme other than the first position measuring scheme.

Meanwhile, the control unit 250 may control a general operation of the user terminal apparatus 200. As an example, the control unit 250 may control the display unit 230 to display the position measured in the position measurement unit 240 on a screen.

Meanwhile, the method for measuring a position according to various exemplary embodiments of the present invention described above may be implemented in an installation data form and be provided in servers or devices in a state in which it is stored in various non-transitory computer readable media. Therefore, the respective apparatuses may access the servers or the devices in which the installation data are stored to download the installation data.

The non-transitory computer readable medium is not a medium that stores data therein for a while, such as a register, a cache, a memory, or the like, but means a medium that semi-permanently stores data therein and is readable by a device. In detail, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

According to various exemplary embodiments of the present invention described above, the GPS satellite invisible area in which reception of the GPS is interrupted or is not smooth due to the surrounding high buildings in a downtown concentrated high rise building area, an internal road of an apartment, or the like, is predicted, and in the case in which the moving object enters the GPS satellite invisible area, the position of the moving object is measured on the basis of at least one of the first position measuring scheme using the GPS satellites and the second position measuring scheme other than the first position measuring scheme to minimize a position measuring error in the GPS satellite invisible area, thereby making it possible to improve accuracy of the position.

In addition, according to various exemplary embodiments of the present invention described above, when the orbit information of the GPS satellite that is not observable at the current position of the moving object is received, the position of the moving object is measured in a state in which the received orbit information is excluded, thereby making it possible to minimize the consumption of the power, the time, the memory, and the like, due to the use of unnecessary information and improve the accuracy of the position.

Although the exemplary embodiments of the present invention have been illustrated and described hereinabove, the present invention is not limited to the above-mentioned specific exemplary embodiments, but may be variously modified by those skilled in the art to which the present invention pertains without departing from the scope and spirit of the present invention as disclosed in the accompanying claims. These modifications should also be understood to fall within the scope of the present invention.

What is claimed is:

1. A method for measuring a position, comprising:
   determining a global positioning system (GPS) satellite visible area and a GPS satellite invisible area depending on whether or not an area is an area in which a predetermined number or more of GPS satellites are observable;
   measuring a position of a moving object on the basis of a first position measuring scheme using GPS satellites in the case in which the moving object enters the GPS satellite visible area; and
   measuring the position of the moving object on the basis of at least one of the first position measuring scheme and a second position measuring scheme other than the first position measuring scheme in the case in which the moving object enters the GPS satellite invisible area,
   wherein the determining includes:
   determining a GPS satellite observable angle; and
   defining a GPS satellite observable area on the basis of the determined GPS satellite observable angle,
   wherein the GPS satellite observable area has a shape in which it has a predetermined angle determined on the basis of the determined GPS satellite observable angle as a center angle and has a bottom surface toward the sky in which the GPS satellites are positioned.

2. The method for measuring the position of claim 1, wherein in the determining, the GPS satellite visible area and the GPS satellite invisible area are determined using real world height information and orbit information of the GPS satellites, wherein the real world height information is pre-stored in a server apparatus or a storage medium of an apparatus for measuring the position.

3. The method for measuring the position of claim 2, wherein the orbit information of the GPS satellites is Ephemeris information included in GPS signals.

4. The method for measuring the position of claim 2, wherein the determining includes:
   determining heights of objects and a bare earth positioned in the real world using the real world height information; and
   determining the GPS satellite observable angle on the basis of the position of the moving object that is to travel in a corresponding area and the determined heights.

5. The method for measuring the position of claim 2, wherein in the measuring of the position, the position of the moving object is measured in a state in which orbit information of a GPS satellite that is not observable in a corresponding area is excluded when the orbit information of the GPS satellite that is not observable is received.

6. The method for measuring the position of claim 1, wherein the determining further includes:
   determining the number of GPS satellites positioned in the GPS satellite observable area using the orbit information of the GPS satellites;
   determining that a corresponding area is the GPS satellite visible area in the case in which the number of GPS satellites positioned in the GPS satellite observable area is four or more; and
   determining that a corresponding area is the GPS satellite invisible area in the case in which the number of GPS satellites positioned in the GPS satellite observable area is less than four.

7. The method for measuring the position of claim 1, wherein the second position measuring scheme includes at least one of a position measuring scheme using speed information and steering information of the moving object, a position measuring scheme using wireless fidelity (Wi-Fi), and a position measuring scheme using comparison between an image photographed in real time and real world modeling data, wherein the real world modeling data is pre-stored in a server apparatus or a storage medium of an apparatus for measuring the position.

8. A computer readable recording medium in which a program for executing the method for measuring the position of claim 1 is recorded.

9. A program stored in a computer readable recording medium and executing the method for measuring the position of claim 1.

10. An apparatus for measuring a position, comprising:
    a determining unit determining a GPS satellite visible area and a GPS satellite invisible area depending on whether or not an area is an area in which a predetermined number or more of GPS satellites are observable; and
    a position measuring unit measuring a position of a moving object on the basis of a first position measuring scheme using GPS satellites in the case in which the moving object enters the GPS satellite visible area and measuring the position of the moving object on the basis of at least one of the first position measuring scheme and a second position measuring scheme other than the first position measuring scheme in the case in which the moving object enters the GPS satellite invisible area,
    wherein the determining unit includes:
    an angle determining unit determining a GPS satellite observable angle; and
    a GPS satellite observable area defining unit defining a GPS satellite observable area on the basis of the determined GPS satellite observable angle,
    wherein the GPS satellite observable area has a shape in which it has a predetermined angle determined on the basis of the determined GPS satellite observable angle as a center angle and has a bottom surface toward the sky in which the GPS satellites are positioned.

11. The apparatus for measuring the position of claim 10, wherein the determining unit determines the GPS satellite visible area and the GPS satellite invisible area using real world height information and orbit information of the GPS satellites wherein the real world height information is pre-stored in a server apparatus or a storage medium of the apparatus for measuring the position.

12. The apparatus for measuring the position of claim 11, wherein the orbit information of the GPS satellites is Ephemeris information included in GPS signals.

13. The apparatus for measuring the position of claim 11, wherein the measuring unit measures the position of the moving object in a state in which orbit information of a GPS satellite that is not observable in a corresponding area is excluded when the orbit information of the GPS satellite that is not observable is received.

14. The apparatus for measuring the position of claim 11, wherein the determining unit includes:
a height determining unit determining heights of objects and a bare earth positioned in the real world using the real world height information; and
an angle determining unit determining the GPS satellite observable angle on the basis of the position of the moving object that is to travel in a corresponding area and the determined heights.

15. The apparatus for measuring the position of claim 10, wherein the determining unit further includes:
a GPS satellite number determining unit determining the number of GPS satellites positioned in the GPS satellite observable area using the orbit information of the GPS satellites;
a GPS satellite visible area determining unit determining that a corresponding area is the GPS satellite visible area in the case in which the number of GPS satellites positioned in the GPS satellite observable area is four or more; and
a GPS satellite invisible area determining unit determining that a corresponding area is the GPS satellite invisible area in the case in which the number of GPS satellites positioned in the GPS satellite observable area is less than four.

16. The apparatus for measuring the position of claim 10, wherein the second position measuring scheme includes at least one of a position measuring scheme using speed information and steering information of the moving object, a position measuring scheme using Wi-Fi, and a position measuring scheme using comparison between an image photographed in real time and real world modeling data, wherein the real world modeling data is pre-stored in a server apparatus or a storage medium of the apparatus for measuring the position.

17. A user terminal apparatus comprising:
a position measurement unit measuring a position of the user terminal apparatus; and
a display unit displaying the measured position,
wherein the position measurement unit includes:
a determining unit determining a GPS satellite visible area and a GPS satellite invisible area depending on whether or not an area is an area in which a predetermined number or more of GPS satellites are observable; and
a position measuring unit measuring a position of a moving object on the basis of a first position measuring scheme using GPS satellites in the case in which the moving object enters the GPS satellite visible area and measuring the position of the moving object on the basis of at least one of the first position measuring scheme and a second position measuring scheme other than the first position measuring scheme in the case in which the moving object enters the GPS satellite invisible area,
wherein the determining unit includes:
an angle determining unit determining a GPS satellite observable angle; and
a GPS satellite observable area defining unit defining a GPS satellite observable area on the basis of the determined GPS satellite observable angle,
wherein the GPS satellite observable area has a shape in which it has a predetermined angle determined on the basis of the determined GPS satellite observable angle as a center angle and has a bottom surface toward the sky in which the GPS satellites are positioned.

* * * * *